Figures 1, 2:
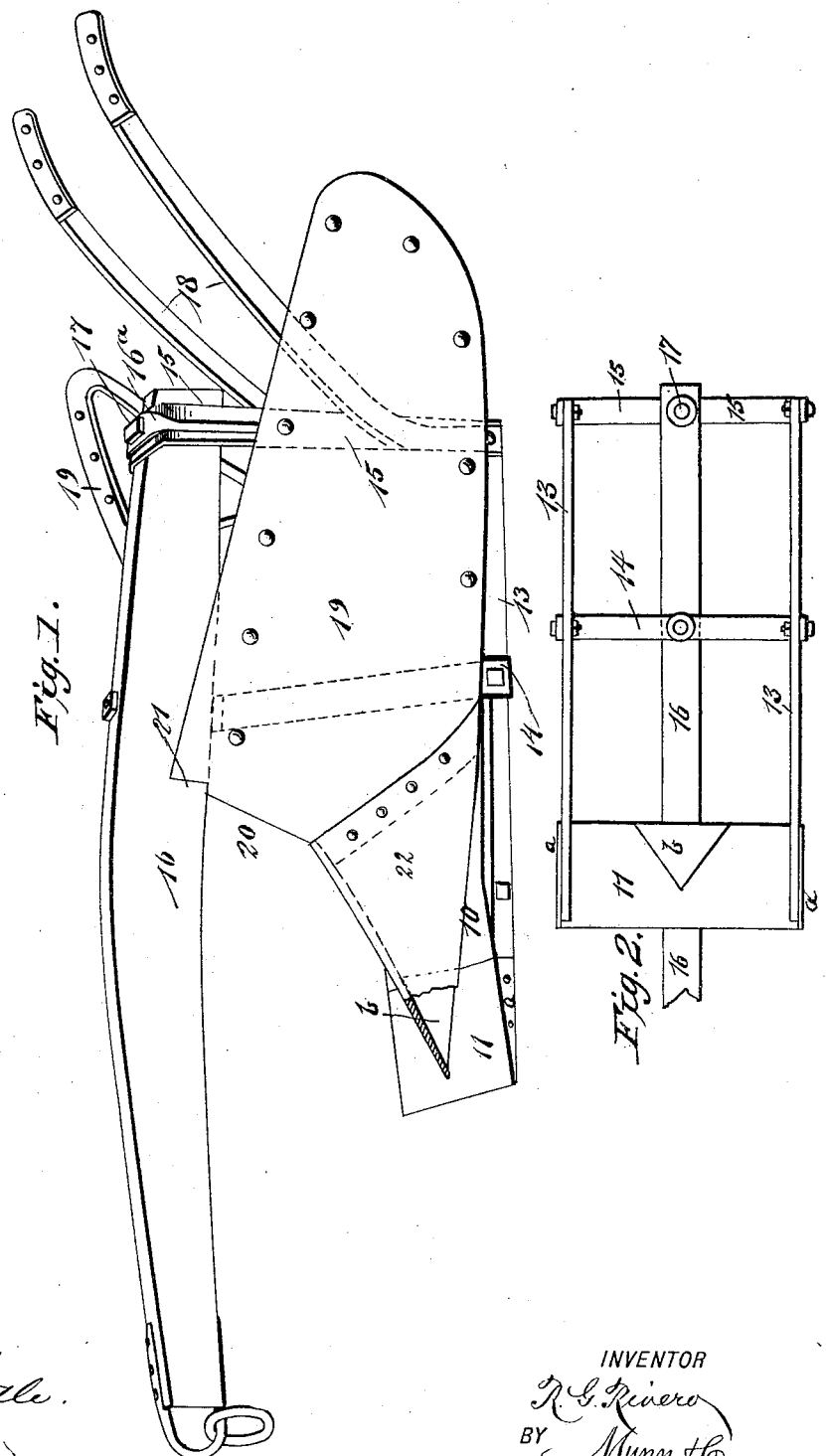

(No Model.)

R. G. RIVERO.
PLOW.

No. 495,837.

Patented Apr. 18, 1893.

WITNESSES:
F. McArdle.
C. Sedgwick.

INVENTOR
R. G. Rivero
BY Munn & Co
ATTORNEYS.

UNITED STATES PATENT OFFICE.

RAMON G. RIVERO, OF MONTEREY, MEXICO.

PLOW.

SPECIFICATION forming part of Letters Patent No. 495,837, dated April 18, 1893.

Application filed October 3, 1892. Serial No. 447,666. (No model.)

*To all whom it may concern:*

Be it known that I, RAMON G. RIVERO, of Monterey, Mexico, have invented a new and Improved Plow, of which the following is a full, clear, and exact description.

My invention relates to improvements in plows, and the object of my invention is to produce a double moldboard plow, which will cut the earth in a uniform manner, will run comparatively easy, and will completely turn the furrow in all cases.

To this end my invention consists in a plow, the construction of which will be hereinafter described and claimed.

In the accompanying drawings—Figure 1 is a perspective view of my improved plow, and Fig. 2 is an inverted plan of a portion of the same.

The body of the plow consists of the flat, straight-edged point, 11, the angular share, 22, having the nearly horizontal lateral wings, 10, and the two mold-boards 19. The frame to which these parts are secured consists of the parallel side and base bars, 13, and the two V-shaped braces, or standards, 14 and 15, which are attached at their apexes to the beam, 16, and diverge laterally therefrom, as shown in Fig. 2, their lower ends being bolted to the base bars, 13, as shown. It will be seen the brace, 14, is attached to the under side of the beam, and the brace, 15, together with a supplementary one 16ª, is secured to the upper side of the beam by means of a bolt, 17. The handles, 18, are bolted to the lower portions of the brace 15. The mold-boards, 19, are notched at the front, 21, to receive the beam, 16. The point, 11, may be made integral with the share, 22, but is preferably separate, as shown, in order to allow convenient repair. The side flanges, *a*, of the point, 11, are bolted to the tapered front ends of the base bars, 13, and the rear edge of the point is also bent up, thus forming a central angular projection, *b*, which fits into and lies beneath the front end of the share, 22. In other words, the pointed end of the latter overlaps and fits upon the projection, *b*. The rear edge of share, 22, is riveted to the mold boards, 19.

The plow produced by above construction and arrangement of parts is very light yet strong, and also well adapted for its function.

What I claim is—

1. The combination, with the beam, the double mold-board, 19, and the side bars, 13, of the braces, 14, 15, which are secured to and diverge laterally from the beam, the angular share having horizontal lateral portions, 10, and the point, 11, which is secured to the said bars, as shown and described.

2. The combination, with the beam, double mold-boards, side bars, and angular share, 22, of the straight-edged point, 11, secured to said bars and having the central portion, *b*, of its rear edge bent up and fitted in the correspondingly-recessed front end of the overlapping share, as shown and described.

RAMON G. RIVERO.

Witnesses:
J. O. RICE,
J. W. GIBSON.